Sept. 3, 1963 H. JESS 3,102,991
SONAR EQUIPMENT FOR SINGLE-TRANSDUCER OPERATION
Filed July 15, 1959
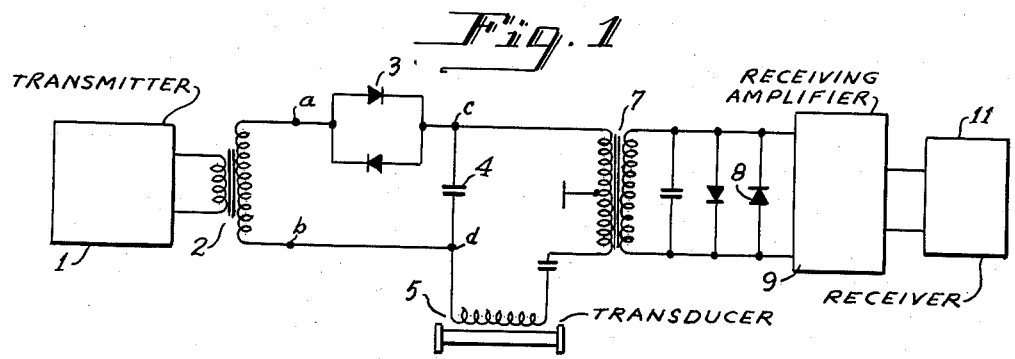
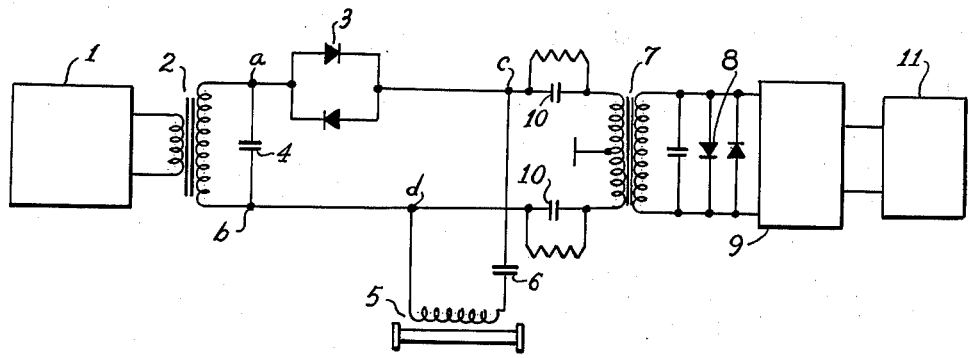

United States Patent Office 3,102,991
Patented Sept. 3, 1963

3,102,991
SONAR EQUIPMENT FOR SINGLE-TRANSDUCER OPERATION
Harring Jess, Kiel, Schleswig-Holstein, Germany, assignor to Electroacustic Gesellschaft mit beschrankter Haftung, Kiel, Germany, a corporation of Germany
Filed July 15, 1959, Ser. No. 827,389
Claims priority, application Germany July 19, 1958
2 Claims. (Cl. 340—3)

My invention relates to echo-sounding devices or similar sonar equipment for operation with a single transducer for the reciprocal conversion of electroacoustic and electromagnetic energy.

Due to the junction between transmitting and receiving circuits in sonar equipment of this type, any disturbances originating in the electric transmitter portion will directly pass to the input of the receiving amplifier, such disturbances being due, for instance, to humming of the transmitter tubes, corona discharges at the high-voltage transformers, or extraneous magnetic fields which may reach the transmitter transformer. Although the disturbing voltages are slight, they pass through the highly sensitive receiving amplifier and hence cause faulty indication in the receiver during the transmitting pauses. For minimizing such trouble, it is customary to carefully select the transmitter tubes or to temporarily separate the transmitter circuits from the receiving circuits by an auxiliary relay during the transmitting pauses. However, the proper selection or matching of the transmitter tubes for freedom from humming is time-consuming and does not secure a permanent result; and the use of auxiliary cut-off relays involves other drawbacks since such relays must be switched on prior to issuing the transmitter pulse to take care of the inherent time constant of electromagnetic motion, and they also require a drop-off time after termination of the transmitter pulse. The need for such drop-off periods renders the receiving channel inactive temporarily and thus precludes using such relays when the sounding distances are short. For securing the switching-on motion of the relays prior to issuance of the transmitter signals, an additional voltage source and special contact devices must be provided.

It is an object of my invention to eliminate the above-mentioned disadvantages.

To this end, and in accordance with a feature of my invention, I connect one or more amplitude-dependent resistors in one or both output leads of the transmitter but outside of the transducer-receiver channel, so as to prevent any transmitter disturbances, having a voltage amplitude below the resistor threshold value, from affecting the receiving amplifier during the transmitting pauses, whereas echo signals being received can pass unweakened to the receiving amplifier.

The voltage-amplitude-dependent resistors each consisting, for example, of two semiconductor diodes or other asymmetrical electric conductors connected in anti-parallel relation to each other, have the effect of a short circuit when subjected to the transmitter pulses having a large voltage above the resistor threshold value, whereas the resistors offer very great resistance when subjected to the comparatively slight disturbing voltages of the transmitter below the threshold value. As a result, any disturbing voltages coming from the transmitting portion of the sonar equipment are attenuated to such an extent that faulty indication can no longer occur.

According to another feature of my invention, relating to a series connection of transmitter output and amplifier input for avoiding a power drop of the transmitting pulse at the input transformer of the receiving amplifier, another amplitude-dependent resistor is connected in parallel to the receiving amplifier. The latter amplitude-dependent resistor forms a short circuit for the receiving amplifier relative to the transmitting pulses, but forms a very high resistance and hence is ineffective with respect to echo pulses passing from the transducer to the receiving amplifier.

The use of two parallel but oppositely connected vacuum diodes, if necessary placed under bias voltage, to serve as an amplitude-dependent resistor device is known as such in echo-sounding techniques for the purpose of separating particularly strong and weak echo pulses in the receiving amplifier.

The invention will be further described with reference to the embodiments of echo-sounding equipment illustrated by way of example on the accompanying drawing, in which:

FIG. 1 illustrates the schematic circuit diagram of an echo-sounding system in which the transmitter and receiving amplifier are connected in series with the transducer.

FIG. 2 illustrates the circuit diagram of similar sonic equipment in which the transmitter and the receiving amplifier are connected in parallel with respect to the common transducer.

In both illustrations, the pulse-generating electric transmitter is denoted by 1. The output circuit of the transmitter is connected to the primary winding of a transformer 2. The circuit of the secondary winding of transformer 2 comprises an amplitude-dependent resistor consisting of a pair of semiconductor diodes connected in parallel and oppositely poled relation to each other, it being understood that other diodes, such as tubes, are also applicable but less preferred than solid-state devices. Denoted by 4 in both illustrations is a tuning capacitor for the transmitter circuit, and by 5 the electroacoustic transducer which is schematically shown to comprise an inductance winding acting upon a magnetostrictive rod during transmitting intervals and being acted upon by the same rod during receiving intervals (transmitting pauses) in the event an echo of the previously transmitted pulse is being received. A capacitor 6 is provided in series with the transducer for compensating the inductivity of the transducer. In both illustrations, the transducer is connected with the primary winding of a transformer 7 whose secondary winding is connected with the receiving amplifier 9 for operating or controlling an indicating or recording instrument shown schematically at 11 in FIG. 1. Another amplitude-dependent resistor 8, composed of two oppositely poled parallel diodes, preferably semiconductor diodes, is connected across the input leads of the receiving amplifier 9. The tuning capacitors for the receiving portion of the equipment are denoted by 10 in FIG. 2.

In the embodiment of FIG. 1, the amplitude-dependent resistor 3 is connected in series between one of the output terminals $a$ of the transmitting transformer 2 and the junction point $c$ between the transmitting and receiving portions, the tuning capacitor 4 of the transmitting circuit being connected between the points $c$ and $d$. When the transmitter pulse is being released, the amplitude-dependent resistors 3 and 8 have the effect of short circuits because the pulse voltage is far above the threshold voltage, and the power of the transmitter pulse passes nearly unimpeded through the transducer which then issues a sonic pulse into the water. Since the resistors 3 and 8 assume very high resistance values for slight voltage amplitudes in the order of transmitter disturbances and echo pulses, the disturbance voltages from the transmitter do not reach the transformer 7 of the receiving amplifier 9, whereas any echo pulses received by the transducer 5 can act upon the receiving amplifier without appreciable weakening.

In the embodiment according to FIG. 2, the amplitude-responsive resistor 3 is connected between the terminal $a$ of the transmitter output transformer 2 and the junction point $c$ between the transducer, on the one hand, and the transmitter as well as the receiving amplifier on the other hand. In this case, the tuning capacitor 4 of the transmitter circuit is connected between the two output terminals $a$ and $b$ of the transmitter transformer 2 because then the resonance current is prevented in this case from placing an additional load upon the diodes 3. Due to the effect of the amplitude-dependent resistor 8, the receiver input transformer 7 in this embodiment is out of resonance during the intervals of the transmitter pulses so that substantially only the high-ohmic impedances 10, shown to consist of capacitors and parallel-connected ohmic resistors, are connected with the transmitter portion. During reception, however, transformer 7 is not short circuited by resistor 8 and, therefore, its primary winding has a considerable impedance which is series-tuned by the capacitors of impedance 10 to present a low impedance series-tuned circuit to the transducer at points $c$ and $d$.

The invention is not limited to the embodiments particularly illustrated herein. For example a second amplitude-dependent resistor may be connected between the circuit points $b$ and $d$, if the disturbing transmitter voltages make it necessary or desirable to provide for double-pole elimination. Such and other modifications will be apparent to those skilled in the art, upon a study of this disclosure, without departing from the essential features of my invention and within the scope of the claims annexed hereto.

I claim:
1. Sonar apparatus comprising a transmitting-receiving sonic-electric transducer, an electric pulse transmitter and a circuit connected thereto having two output leads, a receiving amplifier and a circuit connected thereto having two input leads of which one is joined with one of said output leads, said transducer being serially connected between the other input lead and the other output lead, a tuning capacitor connected across said two output leads, a resistor having a resistance which decreases with increasing voltage applied to the resistor, said resistor being connected in said one output lead serially between said capacitor and said transmitter for preventing spurious transmitter voltages from reaching said amplifier during transmitting pauses, and a second resistor having a value which decreases with increasing voltage applied thereto, said second resistor being connected across said input leads.

2. Sonar apparatus comprising a transmitting-receiving sonic-electric transducer, an electric pulse transmitter and a receiver having a receiving amplifier, circuit means connecting said transmitter and said amplifier and said transducer in series to form a ring, a resistor having a resistance which decreases with increasing voltage applied to the resistor, said resistor being connected outside of the transducer-receiver channel and in series with said transmitter for preventing spurious transmitter voltages from reaching said amplifier during transmitting pauses, and a second resistor having a resistance which decreases with increasing voltage applied thereto, said resistor being connected across said receiver.

References Cited in the file of this patent
UNITED STATES PATENTS

| | | |
|---|---|---|
| 1,883,613 | Devol | Oct. 18, 1932 |
| 2,112,541 | Morton | Mar. 29, 1938 |
| 2,122,748 | Mayer | July 5, 1938 |
| 2,378,925 | Hoskins et al. | June 26, 1945 |
| 2,400,796 | Watts et al. | May 21, 1946 |
| 2,410,065 | Harrison | Oct. 29, 1946 |
| 2,449,358 | Zappacosta | Sept. 14, 1948 |
| 2,460,316 | Trent et al. | Feb. 1, 1949 |
| 2,491,020 | Winchel | Dec. 13, 1949 |
| 2,547,703 | Hermont et al. | Apr. 3, 1951 |
| 2,817,715 | Blake | Dec. 24, 1957 |
| 2,835,867 | Golden | May 20, 1958 |
| 2,962,584 | Lackoff | Nov. 29, 1960 |
| 2,973,504 | Bobber et al. | Feb. 28, 1961 |